March 8, 1955     E. M. PURCELL     2,703,841
ANTENNA
Filed Aug. 1, 1945
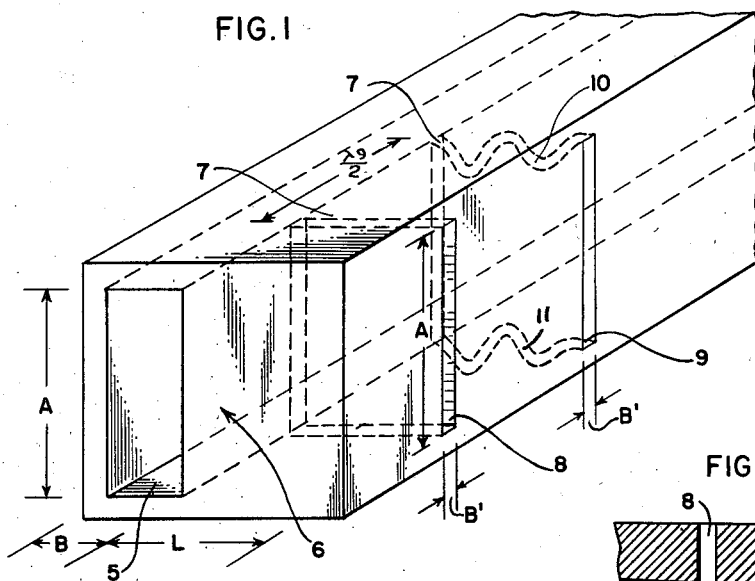
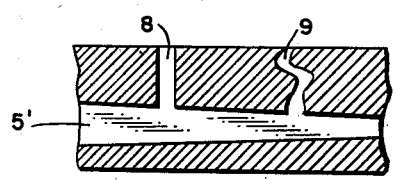
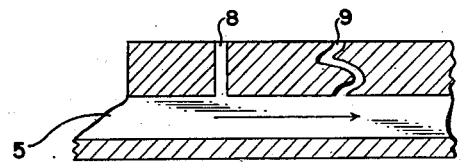
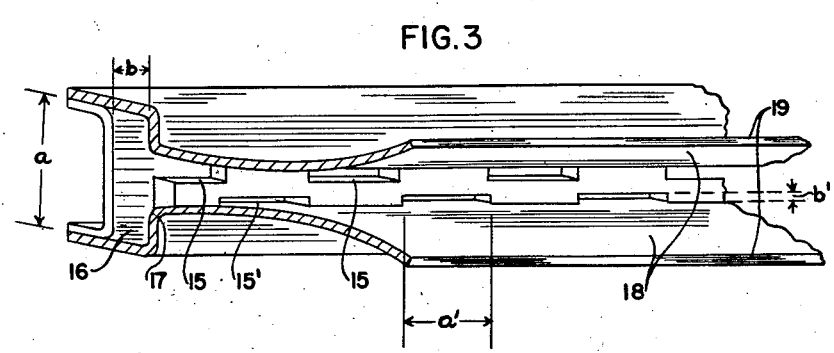
INVENTOR.
EDWARD M. PURCELL
BY
ATTORNEY

2,703,841
ANTENNA

Edward M. Purcell, Cambridge, Mass., assignor, by mesne assignments, to the United States of America as represented by the Secretary of War Application August 1, 1945, Serial No. 608,297

12 Claims. (Cl. 250—33.63)

This invention relates to antennae and more particularly to means for illuminating an antenna by approximately a line source.

Among objects of this invention are: to provide illumination of a predetermined intensity pattern as a source for a cylindrical reflector; to provide uniform intensity illumination as a source for a cylindrical reflector; to make an array which will be easier to construct than one using dipole construction; to build an array in which the wave guide fields do not have excessive field strengths; to build an array the electrical performance of which may be calculated in advance; to build an array adapted for use in high-frequency communications employing wave guide energy transmission.

Further objects, novel features, and advantages of the invention will be apparent from the description contained herein.

In the drawings:

Fig. 1 illustrates one embodiment of the invention;

Fig. 2 shows a section of the embodiment illustrated in Fig. 1;

Fig. 3 illustrates a preferred embodiment showing the best manner in which the invention has been utilized in practice, and Figure 4 illustrates a section similar to Figure 2 showing the gradual tapering of the narrow dimension of the main wave guide shown in Figure 1.

Referring now to the drawings, 5 is a rectangular wave guide having broad walls of width A and narrow walls of width B adapted to transmit energy in the $TE_{0,1}$ mode at the frequency at which the system is designed to operate. One of the broad walls 6 of wave guide 5 has a plurality of apertures 7 leading to branching wave guides such as 8 and 9 extended transversely to the axis of wave guide 5 and their broad sides having dimension A equal to the width of the broad sides of wave guide 5. The narrow sides of wave guides 8 and 9 have a width B'. However, wave guides 9 have broad sides 10 and 11 which are not plane surfaces but are curved, the sides remaining parallel throughout the curvatures. The object of so forming the sides of wave guides 9 will become apparent.

A single element of wave guide fed array is a device for extracting from the main guide a small amount of power and it is very desirable that, in extracting the power, the smallest possible disturbance is created in the main guide itself. The width B' is generally small compared with the width B and it can be shown that as a result each of wave guides 8 and 9 extract a small amount of power from wave guide 5, and serve as elements of a wave guide fed array.

It may be desired that radiation from wave guides 8 and 9 shall be in phase. To this end, the distance between adjacent wave guide elements 8 and 9 is substantially one-half wave length $\lambda_g$ in the main guide 5. Therefore, radiation at adjacent apertures 7 is out of phase. However, wave guides 8 are each substantially one-quarter (or odd multiple quarter) wave length $\lambda_g$ electrically, and wave guides 9, due to the extra curvature, are longer by substantially ½ wave length $\lambda_g$. In general, if wave guides 8 and 9 differ by an odd number of half wave lengths, the desired phasing is achieved. The width B' and A are preferably such that only the $TE_{0,1}$ mode may be transmitted by wave guides 8 and 9.

It is possible to show that the disturbance in wave guide 5 introduced by the extraction of energy through apertures 7 is considerably less than would be caused by a like amount of energy extracted by simply opening apertures 7 to free space. This apparently anomalous result is due to the fact that quarter wave length (and odd multiple quarter wave lengths) branching wave guides appear as nearly resistive elements in the equivalent circuit rather than as reactive elements. Therefore, the standing wave ratio in the main wave guide 5 is not greatly affected.

One way in which the radiation pattern from wave guides 8 and 9 can be predetermined is to vary their narrow dimensions B'. Although this may be done, the end correction necessary to cause the lengths of wave guides 8 and 9 to be corrected to an odd number of electrical quarter wave length is dependent on B'. A much simpler way of obtaining the same result is to taper the main guide uniformly in its narrow width.

For uniform radiation, assume that one introduces whatever tapering is necessary from the input end of the main wave guide 5, as shown in Figure 4, and then adjusts the width B' of each of wave guides 8 and 9 until the radiation is uniform. Power is then abstracted from the guide at a constant rate as a function of distance along the array from the input end of wave guide 5; the power remaining at any point in wave guide 5 is also proportional to this distance. But if the cross sectional area of the guide is likewise reduced proportionally to this distance, the power intensity or Poynting vector will be constant along the array. Since there has been no change along the A dimensions in wave guide 5 this indicates that the current along wall 6 of the guide is the same at all points along the array, and since the absolute amount of power abstracted between branch wave guides 8 and 9 is determined solely by this current and B', the B's must be the same for each of wave guides 8 and 9 to provide uniform power output therefrom.

It would be possible to obtain any other type of illumination according to a desired calculable curve by tapering the narrow width B of waveguide 5 in an appropriate manner.

Referring now to Fig. 3, in this array, branching waveguides 15 and 15' lead from a main wave guide 16. The dimensions of main wave guides 16 and branching wave guides 15 and 15' are chosen to inhibit propagation in any mode except the $TE_{0,1}$ mode. The dimensions labeled $a$, $a'$, $b$ and $b'$ in the array of Fig. 3 correspond respectively to the dimensions labeled A, A', B, and B' of the array shown in Fig. 1. Branching guides 15 and 15' have their broad sides of width $a'$ aligned longitudinally with the axis of main wave guide 16. The currents feeding them are now the transverse current in the broad face of the main wave guide rather than the longitudinal current in the apparatus illustrated in Figs. 1 and 2. Although orienting the branch wave guides as shown in Fig. 3 complicates the calculation of the coupling, it has beneficial effects. First, the transverse current is opposite in sign on the two sides of the broad face 17 of the main wave guide 16, and therefore phase reversal is secured by staggering the successive branching wave guides 15 and 15', instead of securing the needed phase reversal in the manner of Fig. 1 by having adjacent branching guides differing in length by an odd wavelength. Second, because the transverse current is weaker near the center of the broad wall 17, the branching wave guides 15 if near the center require a greater narrow width $b'$ to couple out the same power. At first thought, this might seem to be a detriment, but it will be observed that construction is thereby made simpler and the tolerance on $b'$ less close, a matter of importance when working at small wavelengths.

Branching wave guides 15 and 15' may radiate into a short section of what may be termed a parallel plate waveguide 18 which may be appropriately flared, the mouth of which is then intended to serve as a line source for a cylindrical reflector.

Tapering of the main guide is applied as before. Again, any desired pattern may be achieved thereby. For both embodiments, there is some doubt as to whether the main guide should taper absolutely to zero at the end of the array. This seems likely to upset the behavior of a few elements near the end, and in order to avoid this difficulty the choice was exercised in the present models of tapering the main wave guide 16 to a finite width and then inserting an absorber after the last branch. The fractional amount of power or gain thereby sacrificed may be made small enough to be inconsequential.

In principle, it should be possible to feed an array of this type at a frequency for which the elements are $$\frac{\lambda_g}{2}$$

apart, and the beam emerges normal to the array. If each element introduces no reactance but only a resistance of the correct amount, there would be no internal reflections, and the array would look matched at the input end. This condition could only be attained by extremely accurate regulation of the length of the branching guides. However, one can feed the array off resonance and still have the beam emerge normally from the mouth of the parallel plate wave guide by arranging the outer edges 19 of the plates parallel to a wave front rather than parallel to the array itself. This does not, of course, eliminate the shift in the beam accompanying a change in transmitter frequency.

As is well known in the art, a device capable for use as an antenna for radiation of energy conversely may be used for the reception of energy with similar properties. It is therefore not desired to restrict the claims only to usage of the device for energy radiation purposes.

Furthermore, it will be apparent to those skilled in the art that many variations may be made without departing from the spirit of the invention, and therefore it is not desired to restrict the scope of the application to the precise embodiments herein disclosed.

What is claimed is:

1. An array for the transmission of electromagnetic energy, comprising a main wave guide of rectangular cross section having broad and narrow walls, a plurality of branching wave guides of rectangular cross section, one end of each of said branching guides communicating with said main guide, the other end of each of said branching guides terminating in a common plane in free space, a first group of said branching guides joining said main wave guide in series junctions at intervals along a single broad wall, said intervals being substantially equal to one wavelength in said main guide at the operating frequency, a second group of said branching guides joining said main wave guide in series junctions at intervals along said single broad wall, guides in said second group joining said main guide at points midway between adjacent guides in said first group, said first group of branching guides having a length substantially equal to an odd quarter wave length at the operating frequency, guides in said second group having a length that is substantially an odd half wave length longer than guides in said first group whereby electromagnetic energy is radiated from the ends of said branching guides terminating in free space in accordance with a predetermined space energy pattern.

2. The combination of claim 1 wherein the narrow wall of said main wave guide is tapered to cause the power intensity to be constant throughout the length of said main wave guide.

3. The combination of claim 1 wherein the narrow wall of said main wave guide is tapered so that the energy radiated by said branching wave guides is distributed in accordance with a predetermined mathematical relationship.

4. The combination of claim 1 wherein said main wave guide is tapered throughout its length and is terminated in a resistive load at the end opposite the source of energy whereby energy is radiated from said branching guides with a plane phase front.

5. An array for the transmission of electromagnetic energy, comprising a main wave guide of rectangular cross section having broad and narrow walls, said narrow walls tapering uniformly, a plurality of branching wave guides of rectangular cross section and of uniform dimensions, said branching wave guides communicating with said main wave guide along one of its broad walls and being symmetrically spaced transversely with respect to the center line of said broad wall alternately on each side of said center line, the centers of said branching wave guides being longitudinally spaced apart by distances substantially equal to a half wavelength at the operating frequency of said main guide, said branching wave guides having a length substantially equal to an odd number of quarter wavelengths at the operating frequency of said main guide.

6. An array for the transmission of electromagnetic energy, comprising a main wave guide of rectangular cross section having broad and narrow walls, and a plurality of branching wave guides, said branching wave guides joining said main wave guide along one of its broad walls with the broad walls of said branching wave guides parallel to the longitudinal axis of said main wave guide, said branching wave guides being spaced at intervals of a half wavelength at the operating frequency of the main guide along said main wave guide, adjacent branching guides being spaced by equal distances on opposite sides of the longitudinal axis of said main wave guide, said branching wave guides having a length substantially equal to an odd number of quarter wavelengths at the operating frequency of said main guide, the narrow walls of said main wave guide being tapered such that the relative intensities of signals in said branching guides conform to a predetermined relationship.

7. An array for the transmission of electromagnetic energy, comprising a main wave guide of rectangular cross section having broad and narrow walls, a plurality of branching wave guides, said branching wave guides joining said main wave guide along one of its broad walls with the broad walls of said branching guides parallel to the longitudinal axis of said main wave guide, said branching wave guides being spaced at intervals along said main wave guide, the longitudinal distances between the centers of adjacent branching wave guides being substantially equal to a half wavelength at the operating frequency of said main wave guide, adjacent branching guides being spaced by equal distances on opposite sides of longitudinal axis of said main guide, said branching wave guides having a length substantially equal to an odd number of quarter wavelengths at the operating frequency of said main guide, and a parallel plate wave guide oriented parallel to said main wave guide and flared in a plane perpendicular to the longitudinal axis of said main wave guide, said branching guides communicating with said parallel plate wave guide at ends opposite their junction with said main wave guide, said narrow walls of said main guide being tapered such that the relative intensities of signals in said branching wave guides conform to a predetermined relationship, whereby energy radiated by said array is directed along a predetermined path.

8. An antenna array comprising a main wave guide with a substantially rectangular cross section, one wall of said wave guide having a plurality of apertures therein and forming branching wave guides communicating with said main wave guide, said branching wave guides respectively having lengths substantially equal to an odd number of quarter wavelengths at the operating frequency of said main wave guide.

9. The antenna array of claim 8, wherein said branching wave guides are spaced by intervals of substantially a half wavelength at the operating frequency of the array.

10. The antenna array of claim 8, wherein said one wall and the wall of said main wave guide opposite to said one wall converge so that said main wave guide is tapered and the relative intensity of the energy in said branching wave guides conforms to a predetermined relationship.

11. The antenna array of claim 8, further including a parallel plate flared wave guide disposed parallel to the longitudinal axis of said main wave guide and along the thick wall thereof, said branching wave guides communicating with said parallel plate wave guide for directing the energy of said array along a predetermined path.

12. The antenna array of claim 7, wherein the dimensions of said main and branching wave guides are such that they permit the propagation therein of only the $TE_{0,1}$ mode.

References Cited in the file of this patent

UNITED STATES PATENTS

| | | |
|---|---|---|
| 2,241,119 | Dallenbach | May 6, 1941 |
| 2,283,935 | King | May 26, 1942 |
| 2,349,942 | Dallenbach | May 30, 1944 |
| 2,362,561 | Katzin | Nov. 14, 1944 |
| 2,396,044 | Fox | Mar. 5, 1946 |
| 2,402,622 | Hansen | June 25, 1946 |
| 2,405,242 | Southworth | Aug. 6, 1946 |
| 2,477,510 | Chu | July 26, 1949 |
| 2,479,209 | Chu | Aug. 16, 1949 |